United States Patent [19]
Beach

[11] Patent Number: 4,880,179
[45] Date of Patent: Nov. 14, 1989

[54] FILM CASSETTE

[75] Inventor: David E. Beach, Stow, Vt.

[73] Assignee: Eastman Kodak Company, Rochester, N.Y.

[21] Appl. No.: 296,475

[22] Filed: Jan. 12, 1989

[51] Int. Cl.[4] .............................................. G03B 17/26
[52] U.S. Cl. ..................................... 242/71.1; 354/275
[58] Field of Search .................. 242/71.1, 71; 354/275

[56] References Cited

U.S. PATENT DOCUMENTS

| | | |
|---|---|---|
| 1,685,010 | 9/1928 | Thornton . |
| 2,153,573 | 4/1939 | Kinloch . |
| 3,690,582 | 9/1972 | Duvall . |
| 3,695,160 | 10/1972 | Stockdale . |
| 4,113,192 | 9/1978 | Osanai ............................ 242/71.1 X |
| 4,148,449 | 4/1979 | Kluczynski et al. . |
| 4,200,247 | 4/1980 | Kluczunski et al. . |
| 4,335,948 | 6/1982 | Cocco . |
| 4,395,107 | 7/1983 | Luhrig et al. . |
| 4,407,579 | 10/1983 | Huff . |
| 4,423,943 | 1/1984 | Gold . |
| 4,445,768 | 5/1984 | Gold . |
| 4,482,232 | 11/1984 | Engelsmann et al. .............. 354/275 |

FOREIGN PATENT DOCUMENTS 117756 1/1976 Fed. Rep. of Germany .
985947 3/1951 France .

Primary Examiner—Stuart S. Levy
Assistant Examiner—Steven M. Dubois
Attorney, Agent, or Firm—Roger A. Fields

[57] ABSTRACT

A film cassette is disclosed wherein a film spool having a filmstrip coiled about it is selectively rotatable in opposite directions to advance a leader portion of the filmstrip through a film passage slit to the outside of the cassette shell and to return the leader portion to the inside of the cassette shell. A pile-like material, such as velvet or plush, consisting of short close flexible fibers is secured to the cassette shell along the film passage slit to prevent ambient light substantially from entering the slit. The leader portion has at least one hole adapted to receive a sufficient number of the fibers to allow the fibers to engage the leader portion to prevent its casual creep rearward in the film passage slit. The fibers have a resistance to displacement from the hole which can easily be overcome by rotating the film spool to move the leader portion.

4 Claims, 5 Drawing Sheets

FILM CASSETTE

CROSS-REFERENCE TO RELATED APPLICATIONS

Reference is made to commonly assigned copending U.S. applications Ser. No. 173,396, entitled FILM CASSETTE, and filed Mar. 25, 1988 in the names of Jeffrey C. Robertson and Mark D. Fraser, and Ser. No. 193,323, entitled FILM CASSETTE, and filed May 12, 1988 in the name of Jeffrey C. Robertson.

BACKGROUND OF THE INVENTION

1. Field of the Invention

The invention relates generally to the field of photography, and particularly to a film cassette containing roll film.

2. Description of the Prior Art

In conventional 35 mm film manufacturers' cassettes, such as manufactured by Eastman Kodak Co. and Fuji Photo Film Co., Ltd., the filmstrip is wound on a flanged spool which is rotatably supported within a cylindrical shell. A leading or forward-most section of the filmstrip approximately $2\frac{1}{4}$ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader portion to draw the filmstrip out of the shell.

A 35 mm film cassette has been proposed which, unlike conventional film cassettes, includes a film leader that does not extend outside the cassette shell. The film leader, instead, is located entirely within the cassette shell.

Specifically, in U.S. Pat. No. 4,423,943, granted January 3, 1984, there is disclosed a film cassette wherein the outermost convolution of the film roll wound on the film spool is radially constrained by respective circumferential lips of two axially spaced flanges of the spool to prevent the outermost convolution from contacting an inner wall of the cassette shell. The trailing end of the filmstrip is secured to the film spool. The forward or leading end of the film strip is reduced in width to allow it to protrude from between the circumferential lips and rest against the shell wall at a location inwardly of a film passageway leading to the outside of the cassette shell. During initial unwinding rotation of the film spool, the leading end of the filmstrip is advanced into and through the film passageway in order to exit the cassette shell. The passageway has a width that is slightly less than the width of the filmstrip, thus resulting in the filmstrip being transversely bowed as it is uncoiled from the film spool, and thereby facilitating movement of the film edges under the circumferential lips of the respective flanges. However, transverse bowing of the filmstrip to move its edges under the circumferential lips results in increased friction between the filmstrip and the cassette structure which will impede advance of the filmstrip from the cassette shell and may damage the filmstrip.

The Cross-Referenced Applications

Like the type of film cassette disclosed in U.S. Pat. No. 4,423,923, the cross-referenced applications each disclose a film cassette that contains a non-protruding film leader which is automatically advanced into and through a film passageway to the outside of the cassette shell in response to initial rotation of the film spool in the unwinding direction.

Specifically, there is disclosed a film cassette wherein a convoluted film roll is wound on a spool between a pair of coaxially spaced, independently rotatable flanges. The two flanges have respective circumferential annular lips which prevent the outermost convolution of the film roll from clock-springing into contact with the cassette shell. When the spool is initially rotated, the flanges may remain substantially stationary and the film roll, since its inner end is secured to the spool, tends to expand radially to ensure a non-slipping relation between the outermost convolution and the annular lips. Once the nonslipping relation exists, rotation of the spool will rotate the flanges. This allows stationary internal spreaders to deflect successive portions of the annular lips to an axial dimension exceeding the film width, in turn allowing corresponding portions of the outermost convolution to exit from the radial confinement of the lips without damaging the filmstrip, and to advance into and through a film passageway to the outside of the cassette shell.

The Problem

In the film cassette disclosed in U.S. Pat. No. 4,423,923, and the ones disclosed in the cross-referenced applications, the forward or leading end of the film leader is located inwardly of the film passageway. When the film spool is rotated in the unwinding direction, the leading end is required to "seek" an entrance to the film passageway in order to move into and through the passageway to the outside of the cassette shell. Alternatively, in the film cassettes disclosed in the cross-referenced applications, the leading end could be positioned within the film passageway (rather than inwardly of the passageway). However, because of the possibility of casual rearward creep of the film leader to the inside of the cassette shell, due to vibration during shipping for example, the leading end might fall out of the film passageway.

SUMMARY OF THE INVENTION

The invention advantageously solves the problems described above by providing an improved film cassette wherein (a) a filmstrip is coiled about a rotatable film spool and includes a leader portion which extends along a film passage slit opening to the outside of the cassette shell, and (b) a pile-like material, such as velvet or plush, consisting of short close flexible fibers is secured to the cassette shell along the film passage slit to prevent ambient light substantially from entering the slit, and wherein the improvement comprises:

said leader portion having at least one hole adapted to receive a sufficient number of the fibers to allow the fibers to releasably engage the leader portion to prevent its casual creep rearward in the film passage slit to the inside of the cassette shell.

More particularly, there is provided an improved film cassette wherein (a) a film spool having a filmstrip coiled about it is selectively rotatable in opposite directions to advance a leader portion of the filmstrip through a film passage slit to the outside of the cassette shell and to return the leader portion to the inside of the cassette shell, and (b) a pile-like material consisting of short close flexible fibers is secured to the cassette shell along the film passage slit to prevent ambient light substantially from entering the slit, and wherein the improvement comprises:

said leader portion having at least one hole adapted to receive a sufficient number of the fibers to allow the fibers to engage the leader portion to prevent its casual creep in the film passage slit; and said fibers having a resistance to displacement from the hole which can be overcome by rotating the film spool to move the leader portion.

Preferably, the fibers are inclined generally towards the direction the leader portion is advanced through the film passage slit to the outside of the cassette shell, to facilitate disengagement of the leader portion from the fibers when said leader portion is moved initially in that direction.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
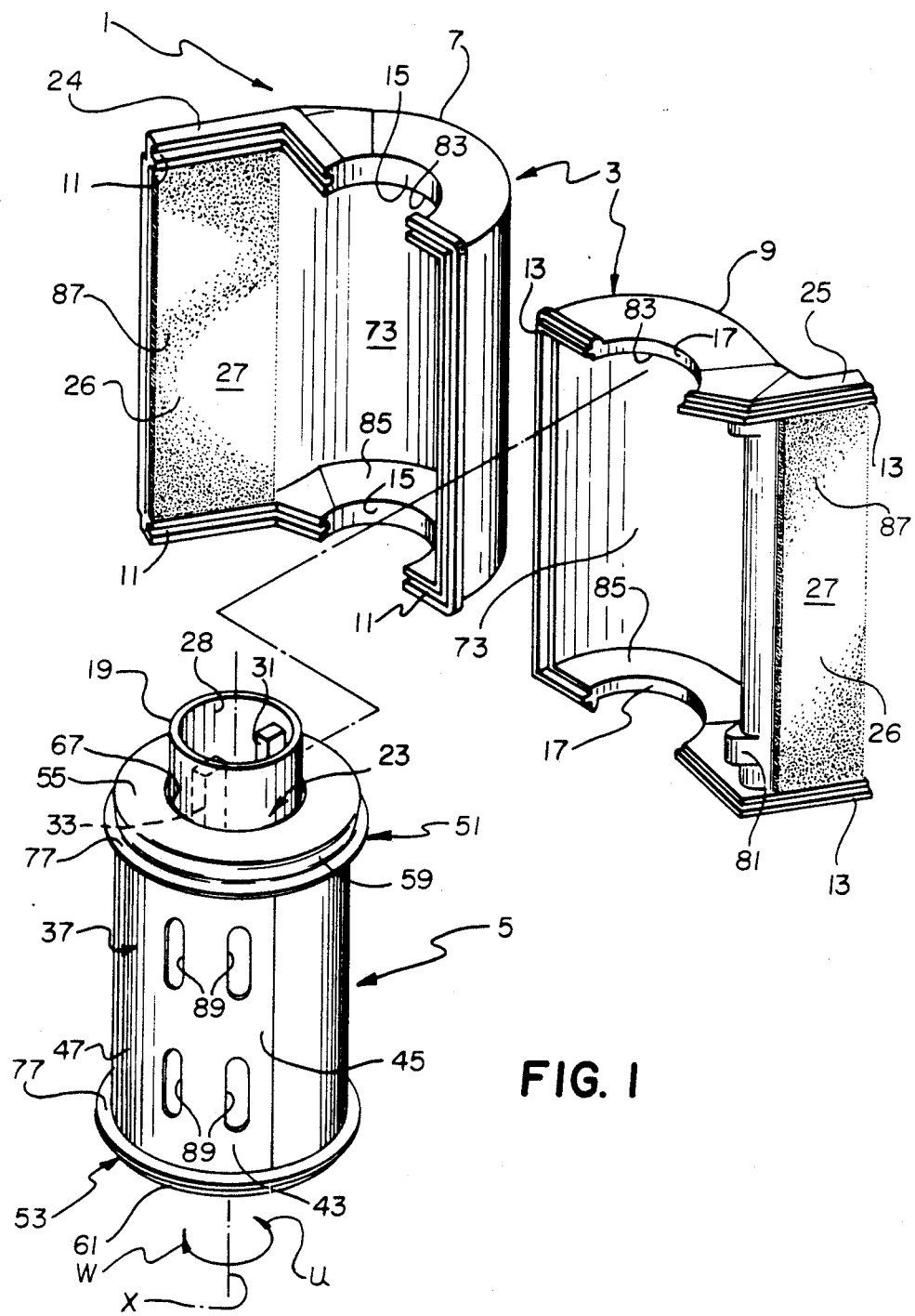
FIG. 1 is an exploded perspective view of an improved film cassette according to a preferred embodiment of the invention.
Figure 2:
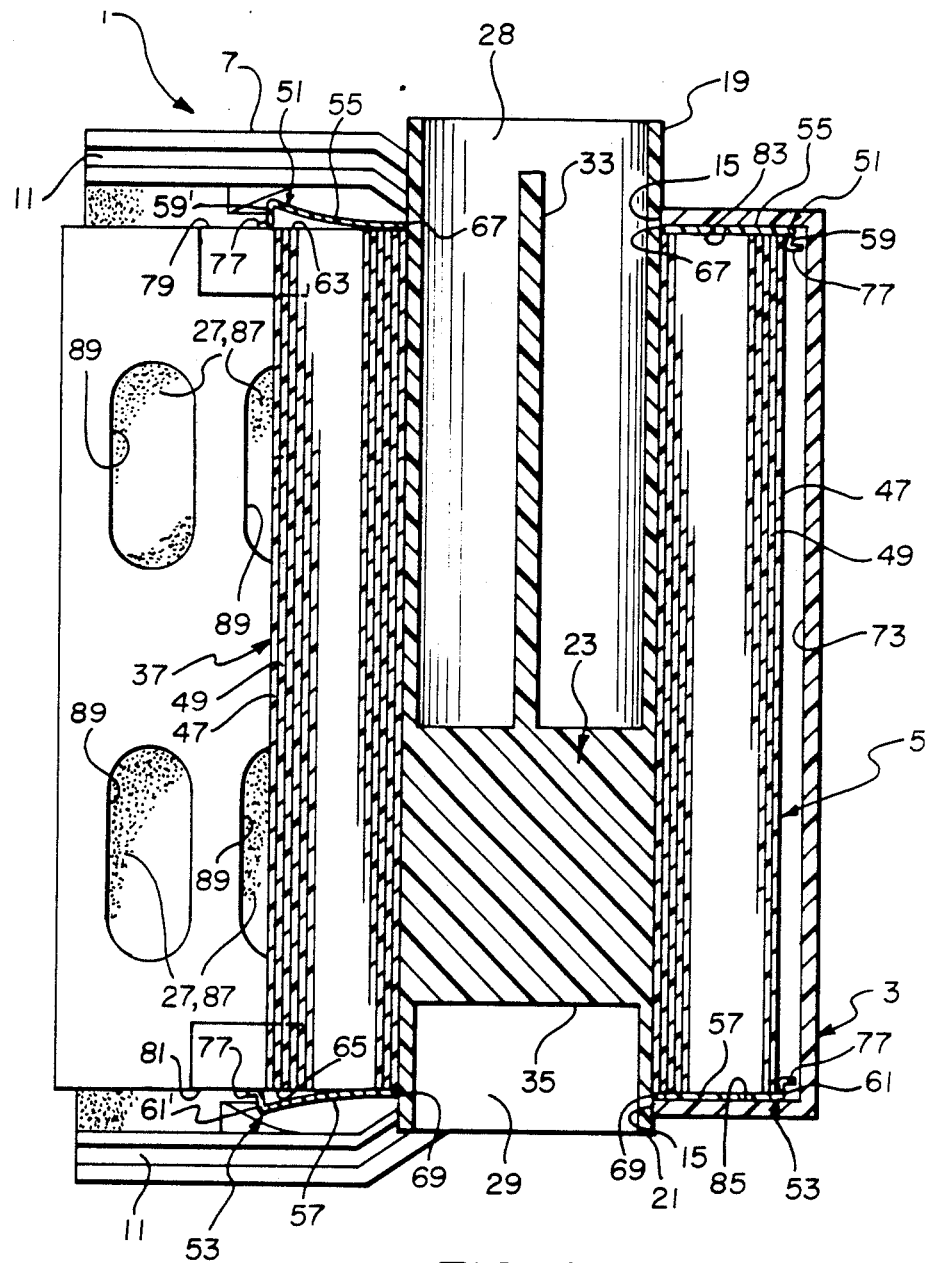
FIG. 2 is an elevation view in cross-section of the improved film cassette.
Figure 3:
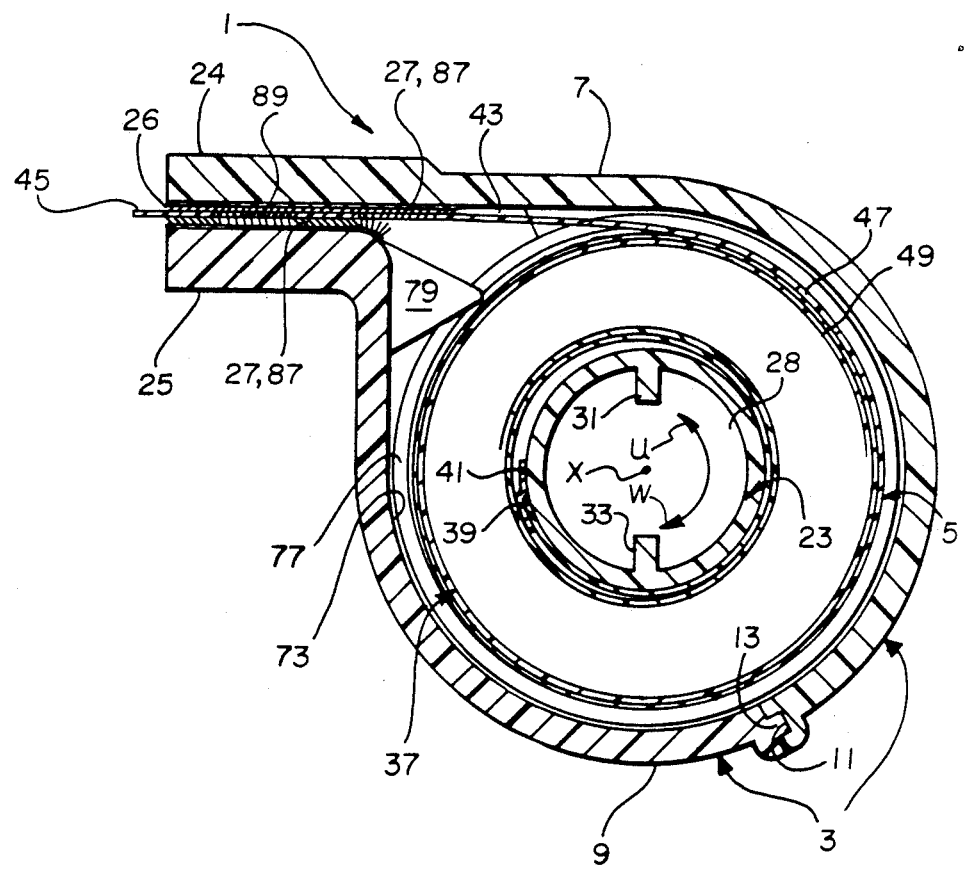
FIG. 3 is an end view in cross-section of the improved film cassette.

Referring now to the drawings, FIGS. 1-3 depict an improved 35 mm film cassette 1 comprising a light-tight cassette shell 3 and a film spool 5 which is rotatable about an axis X within the cassette shell. The cassette shell 3 consists of two shell halves 7 and 9 which are mated along respective grooved and stepped edge portions 11 and 13. The mated halves 7 and 9 define upper and lower aligned openings 15 and 17 for relatively longer and shorter opposite end extensions 19 and 21 of a spool core or hub 23. Also, between respective parallel throat portions 24 and 25 of the mated halves 7 and 9, there is defined a light-trapped film passage slit 26. The light-trapping means for preventing ambient light from entering the film passage slit 26 is a pile-like material 27, such as black velvet or black plush, which lines the interior of the slit. See FIG. 1.

The spool core 23 as shown in FIGS. 1-3 includes relatively longer and shorter coaxial holes 28 and 29 opening at the respective longer and shorter opposite end extensions 19 and 21 of the spool core. A pair of spaced keying ribs 31 and 33 integrally formed with the spool core 23 are located within the longer coaxial hole 28, and a single keying rib 35 similarly formed with the spool core is located within the shorter coaxial hole 29. The several keying ribs 31, 33, and 35 according to custom may be engaged to rotate the film spool 5 in an unwinding direction indicated by the arrow U in FIG. 1, or to rotate the film spool in a winding direction indicated by the arrow W in the same FIG.

A roll 37 of convoluted 35 mm film having a uniform width is wound about the spool core 23. As indicated in FIG. 3, the film roll 37 has an inner or trailing end 39 attached to the spool core 23 by a suitable piece of adhesive tape 41 and a film leader 43. The film leader 43 has a leading or forward end 45 and comprises 2-3 convolutions of the film roll 37. One of these leader convolutions is the outermost convolution 47 and another of them is the next inward succeeding convolution 49.

Figure 6:
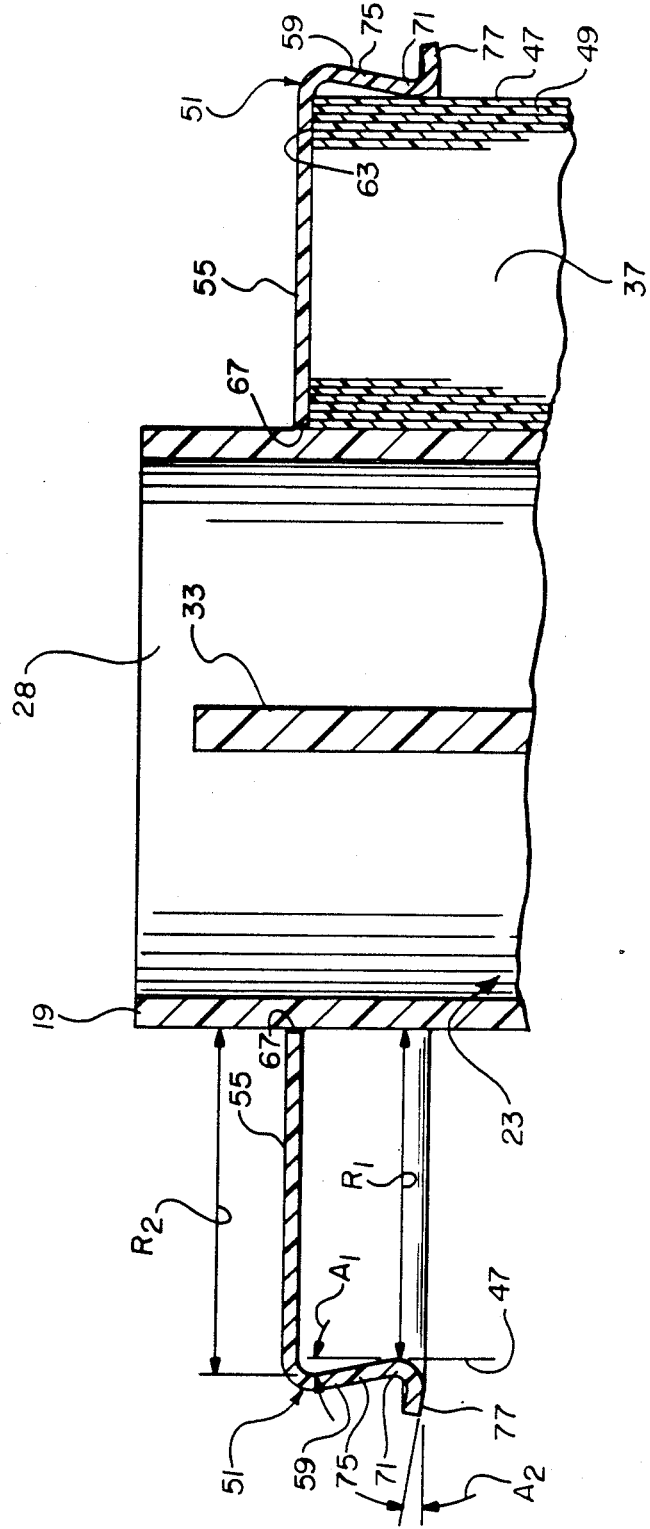
FIG. 6 is an end view in cross-section of one of a pair of flanges associated with a film spool within the cassette shell.

A pair of identical flanges 51 and 53 are coaxially spaced along the spool core 23 as shown in FIGS. 1 and 2. The two flanges 51 and 53 comprise respective integral disks 55 and 57 and respective integral annular lips or skirts 59 and 61 which circumferentially extend from the disks. The two disks 55 and 57 cover opposite sides, i.e. ends, 63 and 65 of the film roll 37 and they have respective central holes 67 and 69 through which the spool core 23 longitudinally extends to permit rotation of the spool core relative to the flanges 51 and 53. Each of the lips 59 and 61 as depicted in FIG. 6 includes the following:

(1) an annular constraining section 71 positioned relatively remote from one of the disks 55 and 57 a predetermined radial distance $R_1$ from the spool core 23 to enable each of the lips 59 and 61 to contact the outermost convolution 47 of the film roll 37, to radially confine the outermost convolution and thereby prevent the film roll from radially expanding or clock-springing against an inner wall 73 of the cassette shell 3;

(2) an annular relief section 75 extending from one of the disks 55 and 57 to the annular constraining section 71 of one of the lips 59 and 61 and positioned a predetermined radial distance $R_2$ from the spool core 23, greater than the radial distance $R_1$, to enable each of the lips to avoid contacting the outermost convolution 47 substantially between one of the disks and the annular constraining section; and (3) an annular free end section 77 inclined radially outwardly from the annular constraining section 71 of one of the lips 59 and 61 and away from the outermost convolution 47.

The annular relief section 75 of each of the lips 59 and 61 is inclined radially inwardly from one of the disks 55 and 57 toward the outermost convolution 47 to form an acute relief angle $A_1$ with the outer most convolution. See FIG. 6. The relief angle $A_1$ may be 11°45', for example. The annular constraining section 71 of each of the lips 59 and 61 is curved radially inwardly with respect to the film roll 37 to enable both of the lips to contact the outermost convolution 47 in a substantially tangential manner (in the vertical sense in FIG. 6) and thereby limit the area of contact between the lips and the outermost convolution. The annular free end section 77 of each of the lips 59 and 61 is tilted slightly upwardly as shown in FIG. 6 to form an acute relief angle $A_2$. The relief angle $A_2$ may be 10°, for example. Thus, as shown in FIG. 2 the lips 59 and 61 are either shaped in the form of a "Z" or an "S".

A pair of rigid identical spreader surfaces 79 and 81 are fixed to the cassette half 9 at separate locations inwardly of the film passage slit 26 as shown in FIG. 2. The respective spreader surfaces 79 and 81 deflect opposite limited portions 59′ and 61′ of the annular lips 59 and 61 axially away from each other to an axial dimension slightly exceeding the film width. See FIG. 2. In essence, the deflected portions 59′ and 61′ of the annular lips 59 and 61 are axially spaced sufficiently to prevent those portions of the lips from radially confining corresponding portions of the outermost convolution 47 of the film roll 37. As indicated in FIG. 2, the remaining portions of the two lips 59 and 61 are maintained in place by inner semi-circular flat surfaces 83 and 85 of the cassette shell 3. The flat surfaces 83 and 85 abut the respective disks 55 and 56, except in the vicinity of the spreader surfaces 79 and 81. Thus, the remaining portions of the two lips 59 and 61 continue to radially confine the outermost convolution 47.

As shown in FIG. 2, the annular free end section 77 of each of the annular lips 59 and 61, at the deflected portions 59′ and 61′ of the two lips, bears against the respective spreader surfaces 79 and 81. Since the annular free end section 77 of each of the lips has a gentle curve to it as best seen in FIG. 6, very little wear occurs between the free end section and either of the spreader surfaces 79 and 81. The relief angle $A_2$ of the annular free end section 77 of each of the lips is useful during assembly of the film cassette 1, to position either of the spreader surfaces 79 and 81 relative to an annular free end section.

Figure 4:
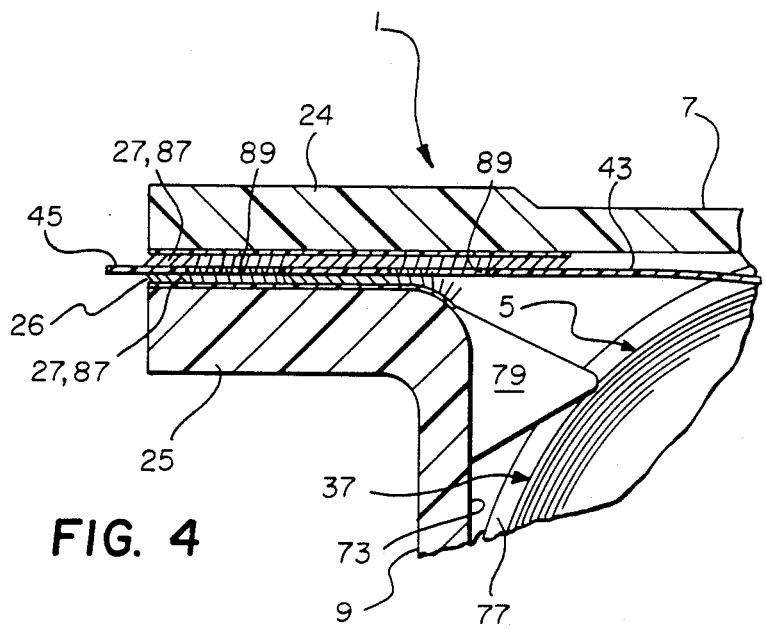
FIG. 4 is an end view similar to FIG. 3 detailing the engagement of a film leader and a plush-like material within a film passage slit of the cassette shell.
Figure 5:
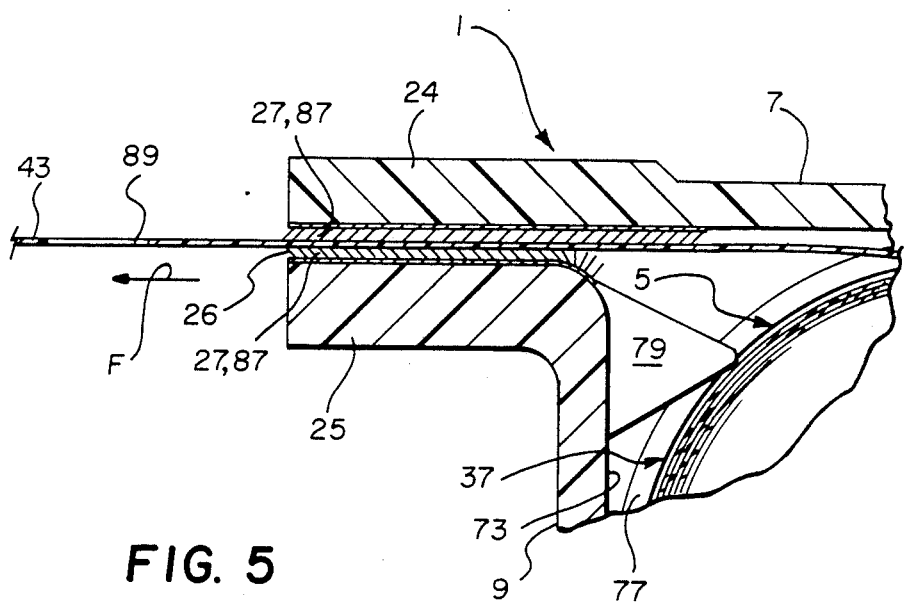
FIG. 5 is an end view similar to FIG. 4 detailing disengagement of the film leader from the plush-like material.

The pile-like material 27 which prevents ambient light from entering the film passage slit 26 consists of short, close, fine fibers or hairs 87. See FIGS. 1 and 3-5. The film leader 43 includes two pairs of identical elongate holes 89 each dimensioned to receive a similar number of the fibers 87 to allow the fibers to engage the leader to prevent its casual creep, particularly rearward, in the film passage slit 26 as shown in FIG. 4. The fibers 87 are inclined generally towards the direction indicated by the arrow F in FIG. 5 the film leader 43 is advanced forward through the film passage slit 26 to the outside of the cassette shell 3, to facilitate disengagement of the film leader from the fibers when the film leader is moved initially in that direction.

Operation

When the spool core 23 is initially rotated in the unwinding direction U, the two flanges 51 and 53 may remain substantially stationary and the film roll 37, since its inner end 39 is attached to the spool core, tends to expand radially or clock-spring to ensure a non-slipping relation between the outermost convolution 47 of the film roll and the annular lips 59 and 61 of the flanges. Then, rotation of the spool core 23 in the same direction will similarly rotate the two flanges 51 and 53 and will urge the forward end 45 of the film leader 43 forward in the direction F within the film passage slit 26. See FIG. 5. The resistance of the film leader 43 to movement, caused by the engagement of the fibers 87 with the film leader is easily overcome at this time. In addition, the two spreader surfaces 79 and 81 will deflect successive portions 59′ and 61′ of the annular lips 59 and 61 axially away from each other as the respective portions are rotated past the spreader surfaces, thereby freeing successive portions of the outermost convolution 47 from the radial confinement of the two lips in the vicinity of the two spreader surfaces. Consequently, continued rotation of the spool core 23 will thrust the film leader 43 forward along the film passage slit 26 to the outside of the cassette shell 3.

The invention has been described with reference to a preferred embodiment. However, it will be appreciated that variations and modifications can be effected within the ordinary skill in the art without departing from the scope of the invention. For example, instead of the invention being used with the type of film cassette capable of automatically advancing the film leader to the outside of the cassette shell in response to initial rotation of the film spool in an unwinding direction, the invention could be used with the type of 35 mm film cassette which is conventional, such as sold by Eastman Kodak or Fuji Photo Film Co., Ltd., and therefore does not have that facility.

I claim:

1. An improved film cassette wherein (a) a filmstrip is coiled about a rotatable film spool and includes a leader portion which extends along a film passage slit opening to the outside of the cassette shell, and (b) a pile-like material consisting of short close flexible fibers is secured to said cassette shell along said film passage slit to prevent ambient light substantially from entering the slit, and wherein the improvement comprises:

said leader portion having at least one hole adapted to receive a sufficient number of said fibers to allow the fibers to releasably engage the leader portion to prevent its casual creep rearward in said film passage slit to the inside of said cassette shell.

2. An improved film cassette wherein (a) a film spool having a filmstrip coiled about it is rotatable in respective directions to advance a leader portion of said filmstrip through a film passage slit to the outside of the cassette shell and to return said leader portion to the inside of the cassette shell, and (b) a pile-like material consisting of short close flexible fibers is secured to said cassette shell along said film passage slit to prevent ambient light substantially from entering the slit, and wherein the improvement comprises:

said leader portion having at least one hole adapted to receive a sufficient number of said fibers to allow the fibers to engage the leader portion to prevent its casual creep in said film passage slit; and said fibers having a resistance to displacement from said hole which can be overcome by rotating said film spool to move said leader portion.

3. The improvement as recited in claim 2, further comprising:

said fibers being inclined generally towards the direction said leader portion is advanced through said film passage slit to the outside of said cassette shell, to facilitate disengagement of the leader portion from the fibers when said leader portion is moved initially in that direction.

4. The improvement as recited in claim 3, wherein said pile-like material is black plush or black velvet.

* * * * *